United States Patent [19]
Ushijima et al.

[11] Patent Number: 4,611,782
[45] Date of Patent: Sep. 16, 1986

[54] VIBRATION ISOLATING APPARATUS

[75] Inventors: Takao Ushijima, Chigasaki; Takeshi Noguchi, Yokohama, both of Japan

[73] Assignee: Bridgestone Corporation, Tokyo, Japan

[21] Appl. No.: 720,729

[22] Filed: Apr. 8, 1985

[30] Foreign Application Priority Data

Jun. 8, 1984 [JP] Japan ............................... 59-117589
Jun. 27, 1984 [JP] Japan ............................... 59-132673

[51] Int. Cl.⁴ ........................ F16M 1/00; F16M 13/00
[52] U.S. Cl. .................................... 248/562; 180/300; 248/636; 248/659; 267/140.1
[58] Field of Search ............... 248/550, 559, 563, 638, 248/659, 636, 562, 563; 180/300; 188/267, 378, 379; 267/140.1, 35, 113, 122

[56] References Cited
U.S. PATENT DOCUMENTS 3,947,007 3/1976 Pelat ................................ 267/140.1
4,277,056 7/1981 Ticks ................................ 267/140.1
4,418,897 12/1983 Hartew ............................ 188/280 X
4,420,060 12/1983 Kakimoto .................... 267/140.1 X
4,428,569 1/1984 Takez ............................... 267/140.1
4,483,521 11/1984 Kakimoto .................... 267/140.1 X
4,511,126 4/1985 Bernuchon ......................... 248/562
4,537,275 8/1985 Kimura ............................... 180/300
4,568,068 2/1986 Kimura ......................... 248/562 X Primary Examiner—J. Franklin Foss
Attorney, Agent, or Firm—Parkhurst & Oliff

[57] ABSTRACT

A vibration isolating apparatus employed for mounting, for example, the engine of an automobile includes a tube communicated with a hollow chamber which is expanded and contracted by vibrations generated in the engine. The tube is provided therein with a mass member which has a larger density than that of a fluid sealed inside the hollow chamber. The mass member is movable by means of the circulation of the fluid inside the tube. Accordingly, the mass member encourages the occurrence of resonance of the fluid inside the tube, whereby the vibrations are absorbed by means of the air-column resonance.

27 Claims, 20 Drawing Figures

4,611,782

VIBRATION ISOLATING APPARATUS

BACKGROUND OF THE INVENTION

1. Field of the Invention

The present invention relates to a vibration isolating apparatus for reducing vibrations from a vibration source.

2. Description of the Prior Art

A vibration isolating apparatus, generally known as a rubber vibration isolator, is employed for mounting, for example, the engine of an automobile so as to absorb the vibrations of the engine such that no vibration is transmitted to the vehicle body.

One type of previously proposed vibration isolating apparatus has such a structure that a fluid is sealed in a hollow chamber of a vibration absorbing main body which is mainly constituted by a hollow molded article of a resilient material, and a tubular portion is connected to the hollow chamber. The vibration isolating apparatus is arranged such that the vibration acting on the hollow chamber causes what is called air-column resonance in the tubular portion whereby it is possible to damp the vibration by a large margin.

The above-described conventional vibration isolating apparatus, however, suffers the following problem. Since the mass of the fluid in the tubular portion has an effect on the resonance frequency, it is necessary to increase the length of the tubular portion to an extreme extent in order to obtain a desired vibration damping characteristic. In particular, when air is employed as the vibration absorbing fluid, since its resistance against the tubular portion is large, the friction occurring between the tubular portion and the vibration absorbing fluid is correspondingly large, which fact disadvantageously involves an adverse effect on the occurrence of the resonance.

SUMMARY OF THE INVENTION

In view of the above-described fact, it is a primary object of the present invention to provide a vibration isolating apparatus which makes it possible to reduce the length of a tubing communicated with the hollow chamber even if the vibration isolating apparatus makes use of the air-column resonance.

To this end, according to the invention, there is provided a vibration isolating apparatus in which a tubing having a small effective area is communicated with a hollow chamber, and a mass member which has a larger density than that of a fluid in the tubing is reciprocatably received inside the tubing.

By virtue of this structure, the mass inside the tubing is favorably increased and, therefore, it is possible to reduce the length of the tubing and consequently to obtain a desired point of resonance. Further, the friction occurring between the tubing and the fluid therein becomes correspondingly small. Thus, it is advantageously possible to obtain a large vibration damping effect.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
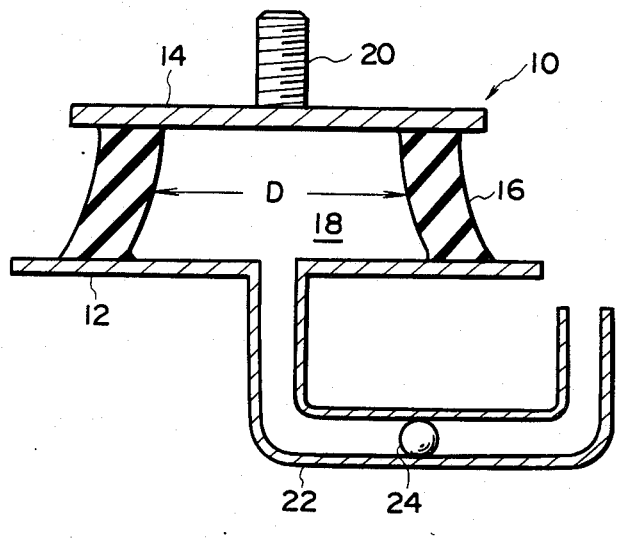
FIG. 1 is a sectional view of a first embodiment of the vibration isolating apparatus according to the present invention.

FIG. 1 is a sectional view of a vibration isolating apparatus 10 to which the present invention is applied.

In the vibration isolating apparatus 10, a cylindrical resilient member 16 is connected between a base plate 12 and a top plate 14 by means of vulcanization, thereby constituting a vibration absorbing main body. A hollow chamber 18 defined between the base plate 12, the top plate 14 and the resilient member 16 constitutes an air chamber.

The base plate 12 is secured to the body of an automobile, not shown. An automotive engine (not shown) is mounted on the top plate 14 through a mounting bolt 20 which projects upwardly from the upper surface of the top plate 14.

The base plate 12 is connected with one of the ends of a tubing 22 in such a manner that the tubing 22 communicates with the hollow chamber 18. The other end of the tubing 22 opens to the atmospheric air. Further, a spherical mass member 24 is disposed inside the tubing 22 in such a manner that the mass member 24 is movable in the longitudinal direction of the tubing 22.

The longitudinal dimension of the tubing 22 is larger than the resonance amplitude of the mass member 24.

In the vibration isolating apparatus 10 in accordance with this embodiment arranged as above, the vibration of the engine acts on the resilient member 16 through the top plate 14 and causes air-column resonance inside the tubing 22, whereby it is possible to effectively absorb the vibration.

In this embodiment in particular, the mass of the inside of the tubing 22 is the sum of the mass $m_1$ of the air and the mass $m_2$ of the mass member 24. Consequently, by making the mass $m_2$ of the mass member 24 larger than the mass $m_1$ of the air inside the tubing 22, it is possible for the tubing 22 to possess a relatively large diameter and to reliably produce the resonance even when the longitudinal dimension of the tubing 22 is relatively small.

Accordingly, by enlarging the inner diameter of the tubing 22, it is possible to reduce the pressure loss produced when the air comes in and out of the tubing 22. More specifically, the pressure loss is inversely proportional to the square of the cross-sectional area of the tubing 22 and, therefore, the enlargement of the inner diameter of the tubing 22, that is, the cross-sectional area thereof advantageously allows a reduction in the pressure loss.

Further, since it is possible to reduce the longitudinal dimension of the tubing 22, it is possible to decrease the frictional resistance occurring between the air and the tubing 22 which is proportional to its longitudinal length, whereby it is possible to eliminate the adverse effect on the occurrence of the resonance.

As the above-described mass member 24, a metal or a synthetic resin may, for example, be employed. It is practical to employ such a material in the form of a solid or fluid which is packed in an easily deformable bag.

Referring next to FIG. 2, there are shown modifications of the tubing 22 employed in the first embodiment. In the modification shown in FIG. 2(A), the tubing 22 is spirally disposed and this makes it possible for a limited space to be effectively utilized.

Figure 2A:
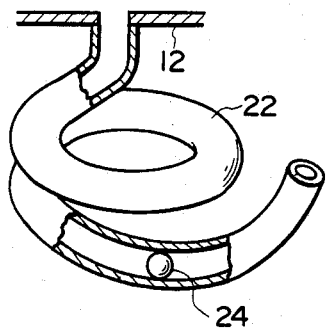
FIGS. 2(A) to 2(E) are sectional views of modifications, respectively, of a tubing and a mass member employed in the first embodiment.
Figure 2B:
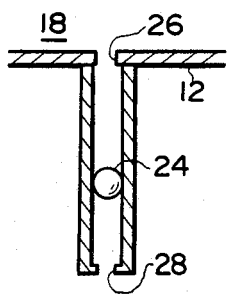

In the modification shown in FIG. 2(B), the tubing 22 is disposed in a straight line form, and at the portion of the tubing 22 at which it communicates with the hollow chamber 18 is a stopper 26 which is constituted by a radially inward projection which reduces the inside diameter of the tubing 22 at that portion. At the other end portion of the tubing 22 also, a stopper 28 is provided in such a manner as to reduce the inside diameter of the tubing 22 at that portion. By this arrangement, the stoppers 26, 28 block the passage of the mass member 24 when it moves vertically, whereby it is possible to prevent the mass member 24 from undesirably coming out of the tubing 22.

Figure 2C:
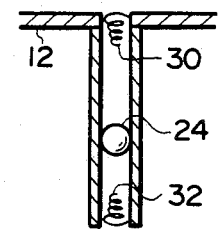
Figure 2D:
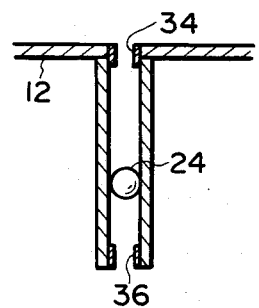

In the modification shown in FIG. 2(C), in place of the stoppers 26, 28, conical coil springs 30, 32 are respectively attached to both end portions of the tubing 22. On the other hand, in the modification shown in FIG. 2(D), resilient cylindrical members 34, 36 are respectively attached to the inner peripheries of both end portions of the tubing 22 in such a mmaner as to serve as stoppers.

Figure 2E:
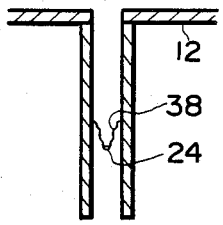
Figure 2F:
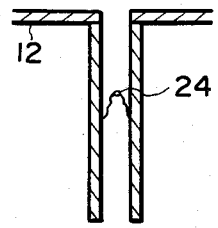
FIG. 2(F) shows the way in which the essential portion of the vibration isolating apparatus shown in FIG. 2(E) operates.

In the modification shown in FIG. 2(E), one of the axial ends of a bellows 38 which is constituted by a flexible cylindrical member is attached to the mass member 24, and the other end of the bellows 38 is attached to the inner periphery of the tubing 22. Accordingly, it is possible for the mass member 24 to move in the axial direction of the tubing 22 by flexibly inverting the bellows 38 in the manner shown in FIG. 2(F). Thus, it is possible to displace the mass member 24 between the positions respectively shown in FIGS. 2(E) and 2(F). The bellows 38 is not necessarily limited to that which shuts out the circulation of the air inside the tubing 22 and may be provided with a through-hole which allows air circulation to take place.

Figure 3:
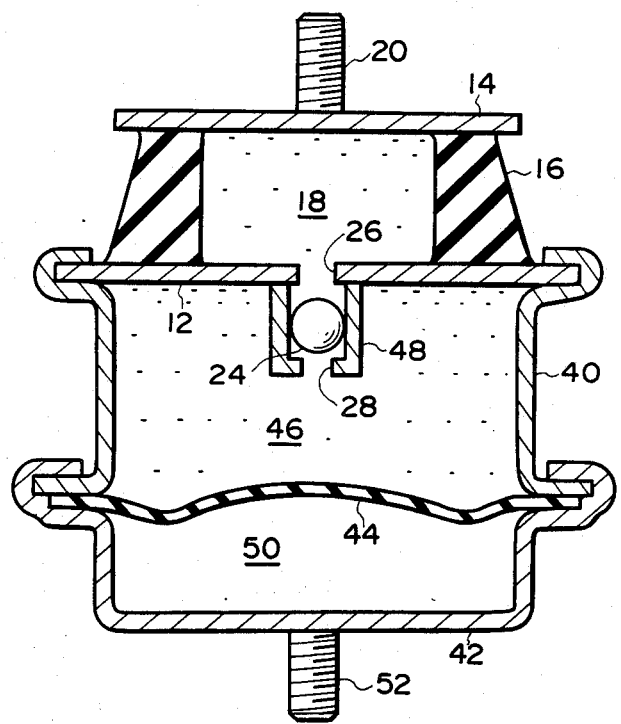
FIGS. 3 to 6 are sectional views of second to fifth embodiments, respectively, of the vibration isolating apparatus according to the invention.

FIG. 3 shows a second embodiment of the vibration isolating apparatus according to the invention.

In this embodiment, the upper end portion of a cylindrical cover 40 is secured to the base plate 12 of the first embodiment. Further, the upper end portion of a cylindrical cover 42 with a closed end is secured to the lower end portion of the cover 40. The peripheral edge portion of a diaphragm 44 is clamped between the covers 40 and 42. Thus, the base plate 12, the cylindrical cover 40 and the diaphragm 44 in combination define a hollow chamber 46.

A liquid is sealed in both the hollow chambers 46 and 18. One of the ends of a tubing 48 is secured to the base plate 12 in such a manner that the hollow chambers 18 and 46 are communicated with each other.

The mass member 24 is also disposed inside the tubing 48 in a manner similar to that in the first embodiment. The stoppers 26 and 28, similar to those shown in FIG. 2(B), are provided on the tubing 48, whereby the mass member 24 is prevented from undesirably coming out of the tubing 48. It is to be noted that an air chamber 50 is defined between the diaphragm 44 and the cylindrical cover 42, and a mounting bolt 52 projects from the lower end portion of the cover 42 in such a manner that it may be employed when the cover 42 is mounted on the vehicle body.

Accordingly, in this embodiment also, when the engine vibrates, air-column resonance occurs inside the tubing 48, whereby it is possible for the vibration to be absorbed.

Figure 4:
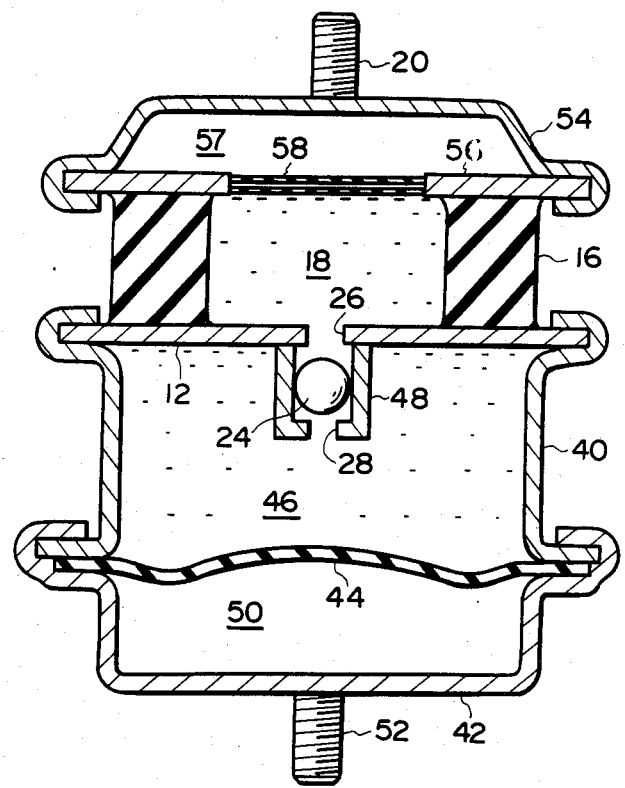

Referring next to FIG. 4, there is shown a third embodiment of the vibration isolating apparatus according to the invention. In this embodiment, the top plate 14 employed in the second embodiment is replaced with a top plate 54 which has its central portion raised relatively high. Further, the periphery of an intermediate plate 56 is fixedly clamped between the top plate 54 and the resilient member 16, whereby an air chamber 57 is defined between the intermediate plate 56 and the top plate 54. The intermediate plate 56 has a through-hole in its axially central portion. A rubber film 58 is stretched over the through-hole. The rubber film 58 is filled with a wire cord or similar means for the purpose of restricting the displacement of the rubber film 58. According to this embodiment arranged as above, when vibrations of very small amplitude act on the vibration isolating apparatus, the displacement of the rubber film 58 is restricted, whereby it is possible to prevent any increase in the rate of vibration transmission.

Figure 5:
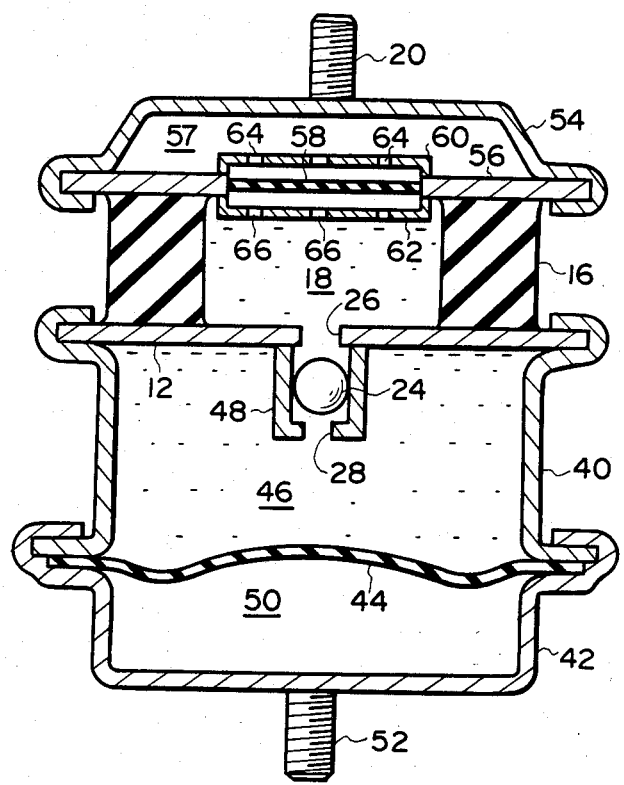

FIG. 5 shows a fourth embodiment of the vibration isolating apparatus according to the invention. In this embodiment, displacement-limiting plates 60, 62 are respectively secured to the intermediate plate 56 on both upper and lower sides thereof. These plates 60, 62 are spaced from the rubber film 58 by a predetermined dimension. The plates 60, 62 are respectively provided with a plurality of through-holes 64, 66 for the purpose of transmitting the pressure in the hollow chamber 18 and that in the upper air chamber 57 to the rubber film 58.

According to this embodiment, therefore, even when the rubber film 58 is not filled with any wire cord, the displacement thereof is restricted, whereby the transmission of vibrations of very small amplitude is prevented.

Figure 6:
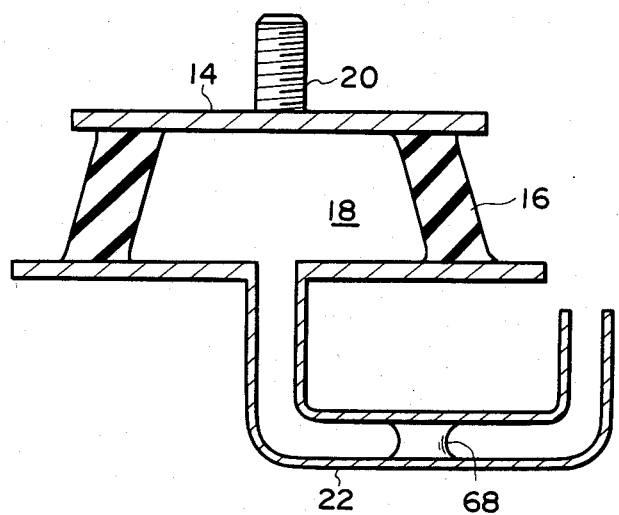

Referring next to FIG. 6 which shows a fifth embodiment of the invention, a mass member 68 in the form of liquid is sealed in the tubing 22 in place of the mass member 24 employed in the first embodiment. With such a mass member 68, it is possible to obtain an effect similar to that in the first embodiment, provided that the mass member 68 satisfies the conditions of a mass member similar to those in the first embodiment.

An experimental example of one embodiment of the invention will now be explained.

The experiment employed the vibration isolating apparatus in accordance with the first embodiment shown in FIG. 1, in which: the volume of the hollow chamber 18 was 60 cc; the effective diameter D of the hollow chamber 18 was 8 cm (the effective diameter in this case represents, in terms of diameter, the pressure-receiving area represented by a varied volume of the hollow chamber with respect to a displacement of 1 cm); the inside diameter of the tubing 22 was 4.8 mm; the longitudinal length of the tubing 22 was 1 m; and, as the mass member 24, two nylon balls (0.125 g) were employed, each having a diameter of 4.7 mm.

Figure 7:
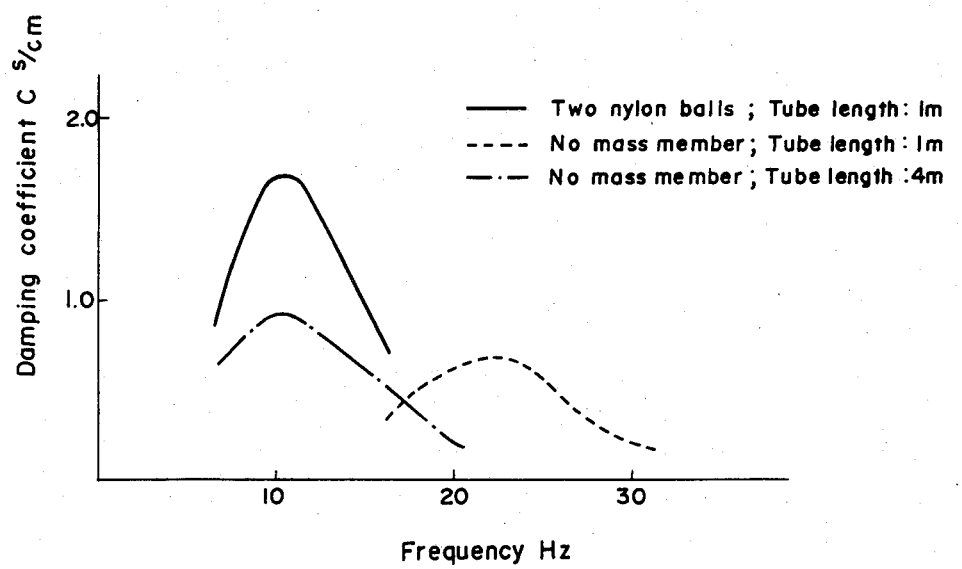
FIG. 7 is a graph representing the relationship between the vibration damping coefficient and the frequency obtained as the experimental result of the first embodiment.

FIG. 7 shows the results of the experiment. As will be clear from the graph shown in FIG. 7, the vibration isolating apparatus in accordance with this embodiment makes it possible to increase the vibration damping coefficient as compared with either the case where no mass member was employed and the length of the tubing was 4 m or the case where no mass member was employed and the length of the tubing was 1 m.

Figure 8:
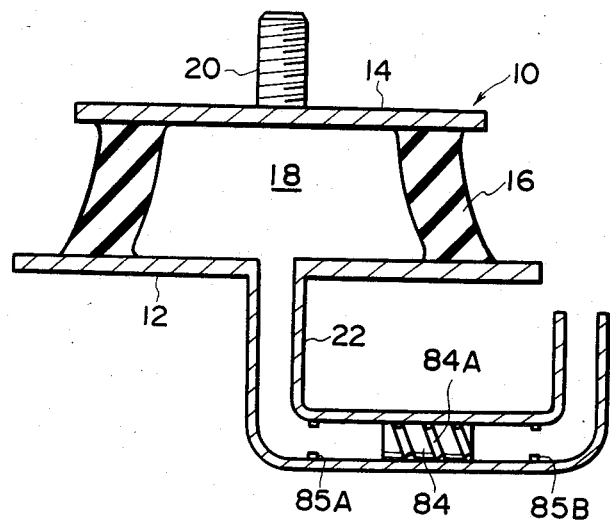
FIG. 8 is a sectional view of a sixth embodiment of the vibration isolating apparatus according to the invention.

FIG. 8 shows a sixth embodiment of the vibration isolating apparatus according to the invention. In this embodiment, a rotating member 84 is disposed inside the tubing 22 in such a manner as to be movable in the longitudinal direction of the tubing 22. The movement of the rotating member 84 in the longitudinal direction thereof is limited by stoppers 85A, 85B which project from the inner periphery of the tubing 22 in a direction in which the inside diameter of the tubing 22 at that portion is reduced.

Figure 9:
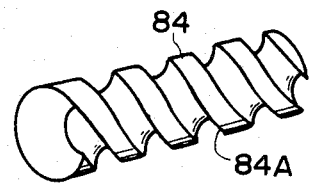
FIG. 9 is a perspective view of a rotating member employed in the sixth embodiment.

The rotating member 84 is, as shown in FIG. 9, constituted by a cylindrical block (made of, for example, a resin or a metal) which has a spiral groove 84A formed on its outer periphery.

It is to be noted that the longitudinal dimension of the portion of the tubing 22 between the stoppers 85A and 85B is larger than the resonance amplitude of the rotating member 84.

In the vibration isolating apparatus 10 in accordance with this embodiment arranged as above, the air-column resonance occurs inside the tubing 22 in a manner similar to that in the above-described embodiments, whereby it is possible for vibrations to be effectively absorbed.

In this embodiment in particular, the inertia of the rotating member 84 generated when it is rotated by means of the circulation of the air inside the spiral groove 84A is advantageously able to contribute to the occurrence of the resonance in addition to the reciprocative movement of the rotating member 84.

It is to be noted that the stoppers 85A and 85B in this embodiment are not needed when there is no risk of the rotating member 84 running out of the tubing 22. In such a case, the bent portions of the tubing 22 may act effectively as stoppers. Further, the shape of the tubing 22 is not necessarily linear, and the tubing 22 may be curved in, for example, a spiral shape.

Figure 10:
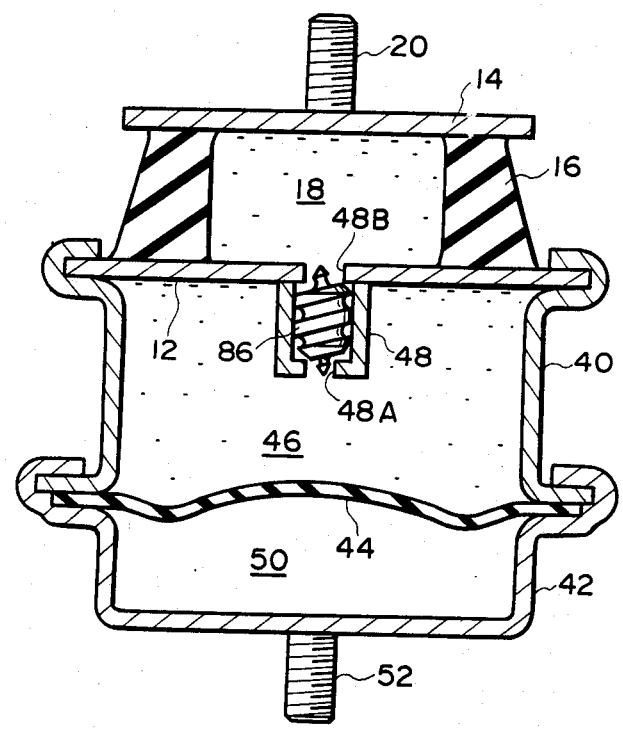
FIG. 10 is a sectional view of a seventh embodiment of the vibration isolating apparatus according to the invention.

Referring next to FIG. 10, there is shown a seventh embodiment of the vibration isolating apparatus according to the invention.

In this embodiment, the upper end portion of the cylindrical cover 40 is secured to the base plate 12 of the sixth embodiment, and the upper end portion of the cylindrical cover 42 with a closed end is secured to the lower end portion of the cover 40, thus forming a structure similar to that shown in FIG. 3.

In a manner similar to that in the above-described embodiment, a rotating member 86 is disposed inside the tubing 48 which is secured to the base plate 12.

The lower end portion of the tubing 48 is bent radially inward in such a manner as to form a stopper 48A. The peripheral edge of the opening of the base plate 12 which provides a communication between the hollow chambers 18 and 46 projects radially inward in such a manner as to reduce the inside diameter of the tubing 48 at that position, thus forming a stopper 48B. In this embodiment, the stoppers 48A, 48B are located in close proximity to the corresponding axial end portions of the rotating member 86, whereby the rotating member 86 is hardly able to move in its axial direction. According to this embodiment, therefore, the rotating member 86 rotates without reciprocating when the top plate 14 vibrates vertically, and the inertia of the rotating member 86 generated when it is rotated causes the resonance inside the tubing 48.

It is a matter of course that the rotating member 86 whose axial movement is restricted in the manner of this embodiment may be applied to the tubing 22 in which the air circulates, such as that in the above-described embodiment.

Figure 11:
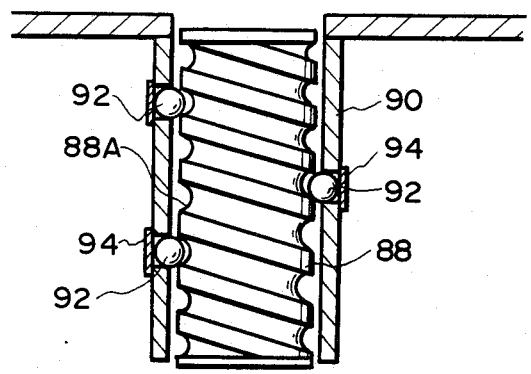
FIG. 11 is a sectional view of a rotating member and other members employed in an eighth embodiment of the vibration isolating apparatus according to the invention.

FIG. 11 shows a rotating member 88 employed in an eighth embodiment of the vibration isolating apparatus according to the invention. The rotating member 88 in this embodiment also has a spiral groove 88A formed on its outer periphery in a manner similar to that in the above-described embodiments. This embodiment, however, differs from the above-described embodiments in that a plurality of balls 92 are retained by the tubing 90 in such a manner that the balls 92 fit in the spiral groove 24A. The outside diameters of the balls 92 are made larger than the inside diameter of the spiral groove 88A so that the balls 92 are in point contact with the rotating member 88.

Thus, the balls 92 in combination constitute a bearing for the rotating member 88. In this embodiment also, the rotating member 88 absorbs vibrations by means of the inertia of the rotating member 88 generated when it is rotated by the circulation of the fluid inside the tubing 90 in a manner similar to that in the above-described embodiments. It is to be noted that stoppers 94 are attached to the outer periphery of the tubing 90 in such a manner as to prevent the respective balls 93 from coming off.

Figure 12:
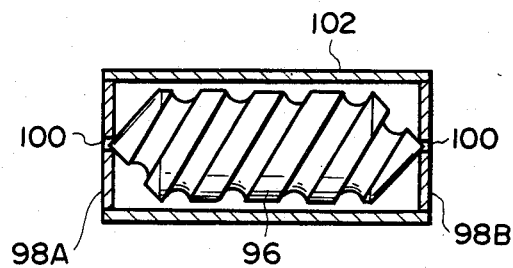
FIG. 12 is a sectional view of a rotating member and other members employed in a ninth embodiment of the vibration isolating apparatus according to the invention.
Figure 13:
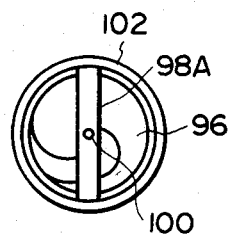
FIG. 13 is a side elevational view of the essential portion of the ninth embodiment shown in FIG. 12.

Referring next to FIGS. 12 and 13, there is shown a rotating member 96 which is employed in a ninth embodiment of the vibration isolating apparatus according to the invention. The rotating member 96 in this embodiment has acute portions formed at both its axial ends. These acute portions respectively abut against small bores 100 respectively formed in stoppers 98A, 98B, whereby the rotating member 96 is rotatably supported. The stoppers 98A, 98B are attached to a tubing 102 similar to that in the above-decribed embodiments. In this embodiment also, when the fluid inside the tubing 102 circulates, the rotating member 96 is rotated by means of the circulation of the fluid such that the vibration is absorbed by means of the inertia of the rotating member 96.

Figure 14:
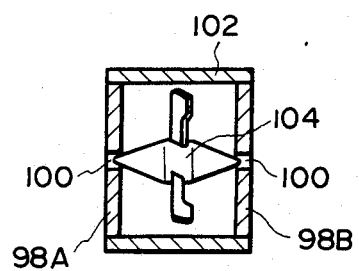
FIG. 14 is a sectional view of a rotating member and other members employed in a tenth embodiment of the vibration isolating apparatus according to the invention.
Figure 15:
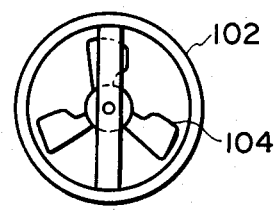
FIG. 15 is a side elevational view of the essential portion of the tenth embodiment shown in FIG. 14.

FIGS. 14 and 15 in combination show a rotating member 104 employed in a tenth embodiment of the vibration isolating apparatus according to the invention. In this embodiment, a rotating member in the shape of a propeller with three blades is employed and has a mounting structure which is similar to that of the above-described embodiment. Accordingly, in this embodiment also, vibrations are absorbed by means of the inertia of the rotating member 104.

What is claimed is:

1. A vibration isolating apparatus for reducing vibrations from a vibration source, comprising:
   (a) a vibration absorbing main body interposed between said vibration source and a vibration receiving portion, said main body having a hollow chamber and a portion thereof which is made of a resilient material;
   (b) a fluid sealed in said hollow chamber in said vibration absorbing main body;
   (c) a tube connected to said vibration absorbing main body in such a manner that one end of said tube is communicated with said hollow chamber, said tube having a small effective area; and
   (d) a mass member disposed inside said tube and having a larger density than that of said fluid, whereby the mass moving inside said tube is increased such as to ensure the occurrence of a desired resonance of said fluid.

2. A vibration isolating apparatus according to claim 1, wherein said fluid is air, and the other end of said tube opens to the atmospheric air.

3. A vibration isolating apparatus according to claim 2, wherein said mass member is spherical and reciprocatable inside said tube.

4. A vibration isolating apparatus according to claim 2, wherein the axis of said tube is spiralled.

5. A vibration isolating apparatus according to claim 1, wherein said tube is provided with a stopper for restricting the movement of said mass member.

6. A vibration isolating apparatus according to claim 5, wherein said stopper projects in such a manner as to reduce the inside diameter of said tube at the portion thereof at which said stopper is provided.

7. A vibration isolating apparatus according to claim 5, wherein said stopper is constituted by a resilient member which is disposed inside said tube in such a manner as to abut against said mass member as it is moved.

8. A vibration isolating apparatus according to claim 5, wherein said stopper is constituted by a bellows having one of the ends thereof attached to said tube and the other attached to said mass member, whereby said mass member is movable by means of the deformation of said bellows.

9. A vibration isolating apparatus according to claim 1, wherein said fluid is liquid and the other end of the tube is communicated with another hollow chamber, said mass member being movable when said fluid circulates.

10. A vibration isolating apparatus according to claim 1, wherein said fluid is air, and said mass member is a liquid which is disposed in an intermediate portion of said tube and is movable by the movement of the air inside said tube.

11. A vibration isolating apparatus according to claim 1, wherein said mass member is rotatable inside said tube around its own axis.

12. A vibration isolating apparatus according to claim 1, wherein said mass member has a spiral groove formed on its outer periphery and is rotatable by means of the resistance produced by said fluid as it passes thereover.

13. A vibration isolating apparatus according to claim 12, wherein said fluid is liquid and the oher end of the tube is communicated with another hollow chamber, said mass member being rotatable when said fluid circulates.

14. A vibration isolating apparatus according to claim 12, wherein said mass member is rotatably supported at both of its axial end portions.

15. A vibration isolating apparatus according to claim 12, wherein said mass member has a propeller blade shape.

16. A vibration isolating apparatus according to claim 1, wherein said mass member is reciprocatable and rotatable inside said tube.

17. A vibration isolating apparatus interposed between a vibration source and a vibration receiving portion for the purpose of reducing vibrations from said vibration source, comprising:
   (a) a top plate secured to either one of said vibration source and said vibration receiving portion;
   (b) a base plate secured to the other of said vibration source and said vibration receiving portion;
   (c) a vibration absorbing main body interposed between said top plate and said base plate, said main body having therein a hollow chamber filled with air and being mainly constituted by a resilient material;
   (d) a tube having one of the ends thereof communicated with said hollow chamber and the other end opening to the atmospheric air; and
   (e) a mass member disposed inside said tube and having a larger density than that of the air in said hollow chamber, said mass member being moved rotatively or reciprocatively by means of the movement of the air inside said tube, whereby the occurrence of resonance of the air inside said tube is encouraged.

18. A vibration isolating apparatus according to claim 17, wherein said mass member is spherical and reciprocatable inside said tube.

19. A vibration isolating apparatus according to claim 18, wherein said tube is provided with a stopper for restricting the movement of said mass member.

20. A vibration isolating apparatus according to claim 17, wherein said mass member is rotatable inside said tube around its own axis.

21. A vibration isolating apparatus according to claim 20, wherein said mass member has a spiral groove formed on its outer periphery and is rotatable by means of the resistance produced by the air inside said tube as it passes thereover.

22. A vibration isolating apparatus for reducing vibrations from a vibration source, comprising:
   (a) a vibration absorbing main body having a pair of hollow chambers interposed between said vibration source and a vibration receiving portion, said hollow chambers containing a fluid in a sealed state, and said main body being provided with a resilient portion such that, when vibrations from said vibration source are transmitted to said vibration absorbing main body, the contracting force of either one of said hollow chambers acts as the expanding force for the other;
(b) a tube provided at a communicating portion between said pair of hollow chambers; and
(c) a mass member disposed inside said tube and having a larger density than that of the fluid inside said hollow chambers, whereby the mass moving inside said tube is enlarged such as to encourage the occurrence of resonance of said fluid.

23. A vibration isolating apparatus according to claim 22, wherein said mass member is spherical and reciprocatable inside said tube.

24. A vibration isolating apparatus according to claim 22, wherein said tube is provided with a stopper for restricting the movement of said mass member.

25. A vibration isolating apparatus according to claim 22, wherein said mass member is rotatable inside said tube around its own axis.

26. A vibration isolating apparatus according to claim 22, wherein said mass member has a spiral groove formed on its outer periphery and is rotatable by means of the resistance produced by said fluid as it passes thereover.

27. A vibration isolating apparatus according to claim 26, wherein said mass member is rotatably supported at both of its axial end portions.

* * * * *